United States Patent [19]

Roberts et al.

[11] Patent Number: 5,413,710

[45] Date of Patent: May 9, 1995

[54] LATERAL UNDERDRAIN

[75] Inventors: R. Lee Roberts, Boothwyn; Douglas H. Eden, Wallingford, both of Pa.

[73] Assignee: Roberts Filter Manufacturing Company, Darby, Pa.

[21] Appl. No.: 149,963

[22] Filed: Nov. 10, 1993

[51] Int. Cl.6 ............................................. B01D 24/24
[52] U.S. Cl. ................................... 210/274; 210/275; 210/279; 210/291
[58] Field of Search ............... 210/274, 275, 291, 293, 210/807, 289, 279

[56] References Cited

U.S. PATENT DOCUMENTS

| | | | |
|---|---|---|---|
| 593,666 | 11/1897 | Jewell et al. | 210/274 |
| 649,409 | 5/1900 | Jewell | 210/274 |
| 650,671 | 5/1900 | Deutsch | 210/274 |
| 653,160 | 7/1900 | Williamson | 210/274 |
| 668,344 | 2/1901 | Wilson | 210/274 |
| 741,055 | 10/1963 | Miller | 210/275 |
| 829,113 | 8/1906 | Leopold | 210/291 |
| 891,998 | 6/1908 | Knight | 210/293 |
| 1,751,819 | 3/1930 | Kniesel | 210/274 |
| 1,998,279 | 4/1935 | Hungerford | 210/274 |
| 2,697,520 | 12/1984 | Ellila | 210/274 |
| 3,189,181 | 6/1965 | Couse | 210/291 |
| 3,831,761 | 8/1974 | Chantereau | 210/274 |
| 4,098,695 | 7/1978 | Novotny | 210/293 |
| 4,191,652 | 3/1980 | Whitmore | 210/275 |
| 4,202,774 | 5/1980 | Kos | 210/274 |
| 4,536,287 | 8/1985 | Himsley et al. | 210/293 |
| 5,066,393 | 11/1991 | Padera et al. | 210/291 |
| 5,068,033 | 11/1991 | Tobias et al. | 210/293 |
| 5,068,034 | 11/1991 | Walter | 210/274 |
| 5,087,362 | 2/1992 | Brown | 210/274 |
| 5,108,627 | 4/1992 | Berkebile | 210/274 |
| 5,149,427 | 9/1992 | Brown et al. | 210/274 |
| 5,156,738 | 10/1992 | Maxson | 210/293 |
| 5,160,614 | 11/1992 | Brown | 210/275 |
| 5,232,592 | 8/1993 | Brown et al. | 210/274 |
| 5,269,920 | 12/1993 | Brown et al. | 210/274 |

OTHER PUBLICATIONS

*Chemtrol Plastic Piping Handbook,* Celanese Piping Systems, Inc. (1979) pp. 1, 10, 11 and 56–65.

*Primary Examiner*—Cynthia L. Nessler
*Attorney, Agent, or Firm*—Woodcock Washburn Kurtz Mackiewicz & Norris

[57] ABSTRACT

A system for distributing both gas and liquid in separate conduits within an underdrain filtration system is disclosed. A tubular liquid conducting conduit also contains a separate air conduit. Extending from each conduit are, respectively, liquid conducting laterals and air laterals. The system is placed within a bed of gravel at the bottom of a filter bed and acts as conventional underdrain blocks and air grids. In a downflow mode, effluent is filtered as it passes through the filter media and filtered water is collected through orifices in the liquid conducting laterals, which in turn feed into the liquid conducting conduit to form a filtrate stream. In a backwash mode, backwash liquid flows through the liquid conducting conduit, out the laterals and up through the filter bed. During backwash, air may be introduced through the air conduit and laterals and rise through the filter media to enhance the effectiveness of the backwash operation. The disclosed system requires a height within the filter that is about equal to the height of the liquid conduit, thus, maximizes filter media depth and permits retrofit applications into relatively shallow filter beds. Methods of installing an underdrain in a filtration system are also disclosed.

15 Claims, 2 Drawing Sheets

LATERAL UNDERDRAIN

The present invention relates to systems for distributing fluids through a gravity or pressure filter of the type having a granular filter bed through which a liquid to be treated may flow downwardly. More particularly, the present invention relates to a system for conducting liquids underneath the filter bed during both filtration (downflow) and backwash, and also for conducting backwash gas beneath the filter bed.

BACKGROUND OF THE INVENTION

The granular media filters used for the purification of water typically comprise a graded bed of gravel and a filter bed of particulate media such as sand, anthracite (carbon) or other filtration materials well known in the art. Underdrain blocks are typically disposed beneath the filter bed and provide an outlet for filtered effluent exiting the bed. Thus, water to be filtered flows downwardly through the filter bed and suspended solids are removed and retained in the filter media. These solid contaminants tend to decrease the effectiveness of the filtration system by decreasing the rate of flow through the filter. The filter bed must therefore be cleaned periodically to remove the contaminants that have collected in the media by a process known as "backwashing." In a backwash operation, the flow of liquid through the underdrain is reversed and backwashing liquid is pumped from the bottom of the filter bed to the top, flowing upward through the media and carrying away the contaminants. In some instances, a backwash gas such as air is supplied in addition to or in conjunction with the backwash liquid. The addition of backwash gas aids in the loosening and removal of solids from the filter media.

Although both backwash liquids and gases can be effectively distributed by underdrains found in the prior art a number of problems remain. First, it is desirable to keep the height of the filtrate collection/backwash distribution as low as possible. This maximizes the volume available within a given filter for filter media. However, many older underdrains do not have the capability of providing a separate air distribution system to permit the controlled introduction of air or another gas during backwash. Although it is possible to remove the filter media and place an air distribution system atop existing underdrain blocks, such a retrofit will lose some filter media depth due to the volume occupied by the air distribution system. Secondly, most prior art designs adapted to distribute both backwash fluid and liquid cannot distribute both fluids evenly over the entire area of the filter. Inherent compromises in the design result in less than optimal performance. Finally, most existing underdrain designs utilize cast or extruded clay or plastic blocks as their primary component. Assembly of the blocks on the floor of the filter results in an interconnected set of passageways to collect and channel filtrate and distribute backwash fluids. Such an underdrain is not easily leveled, a requirement for proper operation.

Thus, it would be desirable to provide an underdrain system capable of collecting filtrate and distributing backwash liquid and backwash gas. It would be further desirable that such a system distribute liquids and fluids in separate streams to permit control over the parameters relating to each type of backwash fluid. It is therefore an object of the present invention to provide an improved underdrain system. It is a further object of the present invention to provide an underdrain that requires a minimum amount of height above the floor of the filter system. It is also an object of the present invention to provide an underdrain that is modular and easily constructed, as well as a system that is easy to assemble on site. Finally, it is another object of the present invention to provide an underdrain system that is simple to level and adjust so that the distribution of liquid and gases is even.

SUMMARY OF THE INVENTION

Accordingly, it has now been found that these and other objects of the present invention are the met by providing a low profile underdrain liquid and air distribution system comprising a liquid conducting manifold and a plurality of liquid conducting laterals in communication with and extending from the liquid conducting manifold. In certain embodiments, a water inlet is provided in the manifold wall to facilitate liquid flow. In accordance with the present invention, an air header is disposed within the liquid conducting manifold and a plurality of perforate air laterals are most preferably connected to the air header and extend from the within the liquid conducting manifold. The air header is preferably connected to extensions that penetrate through the wall of the liquid conducting manifold and provide connection points for the air laterals. Alternatively, the air header is connected to extensions that extend through an opening in the lateral connector and penetrate though its walls at a point outside the liquid conducting manifold to extend upwardly and outwardly from right angle connectors to provide connection points for the air laterals.

Preferably, the liquid conducting laterals comprise a lateral connector that extends from a first connection point outside the manifold, through the manifold wall, and back out to a second connection point outside the manifold. The perforated liquid conducting laterals are then connected to the first and second connection points of the lateral connector. Most preferably, the liquid conducting manifold and the lateral connector are comprised of a circular tubes and the liquid conducting manifold has a first diameter and the lateral connector has a second, smaller diameter. As explained and illustrated below, the lateral connector most preferably passes through the manifold wall at a point offset from its diameter. In preferred embodiments, the lateral connector comprises a circular tube defining a connector wall and a portion of the connector wall disposed inside the liquid conducting manifold is removed to define an opening that further facilitates liquid flow. Most preferably both the liquid and air distribution networks are comprised of PVC pipe or stainless steel.

The present invention also provides methods of installing an underdrain in a filtration system by positioning one or more of the above-described liquid conduits that has an air conduit disposed within each liquid conduit within a floor section of the filtration system, and then attaching a plurality of liquid conducting laterals to one or more lateral connectors that are in communication with an interior portion of the liquid conduit. Next, a plurality of air laterals are attached to one or more connectors in communication with the air conduit. The conduits and laterals are then substantially covered with a layer or layers of gravel and the gravel is then covered with one or more layers of filter media.

DETAILED DESCRIPTION OF THE PREFERRED EMBODIMENTS

As used herein, the term "fluid" is meant to encompass gases, liquids and mixtures thereof as well as mixtures of either gases, liquids or both that also include solid particles. The term "conduit" and "header" both refer to a structure for transmitting fluid, and a "lateral" is one of a plurality of structures in fluid communication with a header or a conduit for distributing the fluid therein. Laterals typically distribute fluid along pathways at right angles to the headers or conduits, however, the present invention also encompasses laterals that connect at other than right angles.

Figure 1:
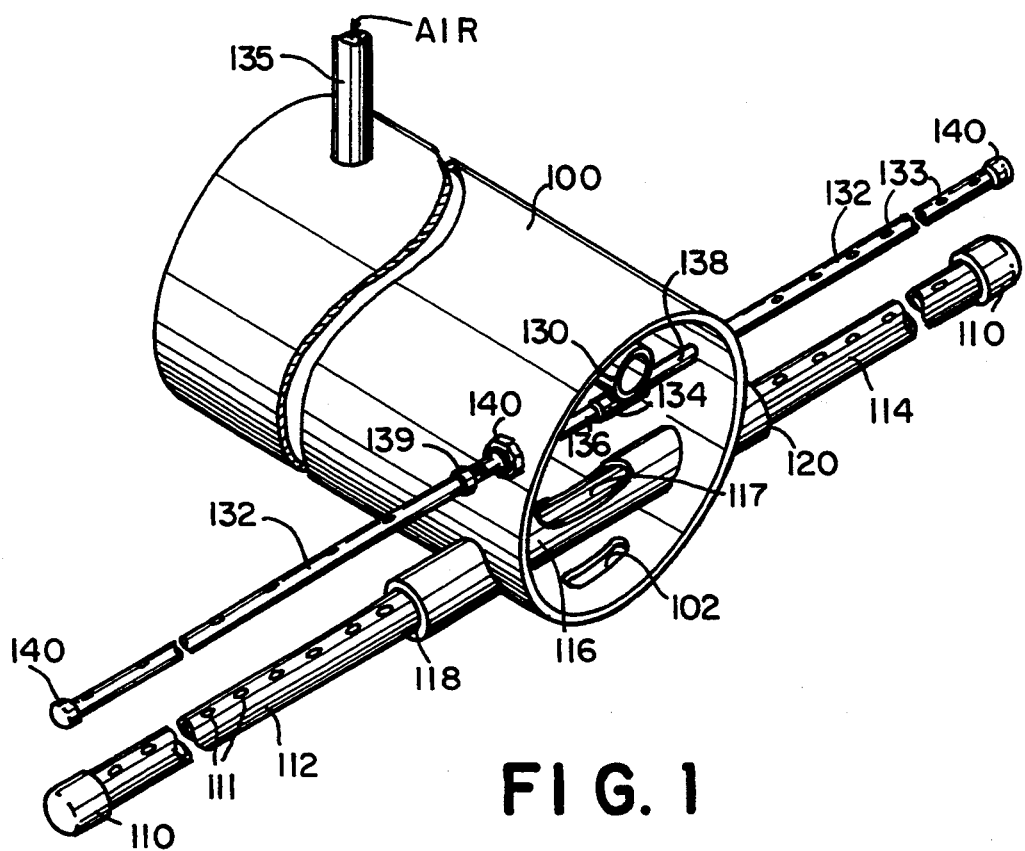
FIG. 1 is a perspective view of a preferred embodiment of the present invention with one end removed to illustrate the interior of the liquid conducting manifold.

Referring now to FIG. 1, there is shown a perspective view of an underdrain fluid distribution system made in accordance with the present invention. A liquid conducting manifold 100 functions as both a major structural element and as part of the underdrain fluid distribution system. In this latter respect, the liquid conducting manifold 100 is the primary conduit for receiving effluent in a filtration mode. Conversely, as explained below, the liquid conducting manifold 100 is also the primary conduit for distributing backwash liquid during backwashing of a filter system. In a most preferred embodiment, the liquid conducting manifold 100 has a diameter of about 12.0 inches and is comprised of polyvinylchloride (PVC) pipe. It will be appreciated that the liquid conducting manifold 100 can be of another size and made from other materials, for example stainless steel. Those of skill in the art will be able to choose both the size of the manifold and the material based upon the design criteria for a particular filter. For example, the pipe chosen should have a wall thickness and schedule sufficient to withstand the load of both the filtration media that overlie the system as well as the weight of the fluid flowing though the filter. Moreover, although the cross-section illustrated is circular other tubular cross-sections, if available, may be employed with the present invention.

As also seen in FIG. 1, a plurality of liquid conducting laterals 110 are in communication with and extend from the liquid conducting manifold 100. In the preferred embodiment shown, the liquid conducting laterals 110 are provided as a pair of capped, perforated tubular laterals 112,114 connected to a tubular lateral connector 116 that extends from a first connection point 118 outside the liquid conducting manifold 100, through the manifold wall, and to a second connection point 120 outside the manifold 100. The perforated laterals 112,114 are connected, respectively, to first and second connection points 118,120 defined by the ends of the lateral connector 116. In the preferred embodiment illustrated, a portion of the wall of the lateral connector 116 disposed inside the liquid conducting manifold 100 is removed to define an opening 117 to facilitate liquid flow through the system. As noted above, although the lateral connector 116 is preferably of a circular cross-section, other shapes may be used in other embodiments of the present invention. Liquid flow to the header is also facilitated in certain embodiments by the provision of an opening 102 in the liquid conducting manifold 100.

Another aspect of the present invention that is illustrated in FIG. 1 is the air header 130 disposed within the liquid conducting manifold 100. The air header 130 is preferably connected to a supply of air by a supply pipe 135 as shown. A plurality of air laterals 132 are connected to the air header 130, and these air laterals 132 preferably extend from within the liquid conducting manifold 100 in a direction perpendicular to the axis of the liquid conducting manifold 100. The air laterals 132 are preferably provided with a plurality of perforations 133 or otherwise provided with nozzles or other means whereby air or another backwash gas that flows through the air manifold 130 is distributed throughout the filter bed. In the preferred embodiment illustrated, the air distribution system is comprised of a relatively simple arrangement of readily available pipe components. A "Tee" fitting 134 is connected to the air manifold 130 by a connector 131. Two connecting sections 136,138 extend from the branches of the fitting 134 and through the wall of the liquid conducting manifold 100. Preferably, the passage though the wall is fitted with a hollow, threaded plug 140 that has a passage therethrough with a diameter that is a close fit with the outside diameter of the connecting sections 136,138, although the joint does not need to be watertight since liquid may flow in, through, and around the liquid conducting manifold 100 when the filter is in use. Once beyond the wall of the liquid conducting manifold 100, the connecting sections 136,138 are preferably terminated with a threaded end, permitting them to accept a threaded coupling 139 that connects them to the air laterals 132. Thus, the assembly of the air grid system that extends beyond the inside of the liquid conducting manifold 100 is relatively simple and modular in that standardized parts and connections are employed.

Figure 2:
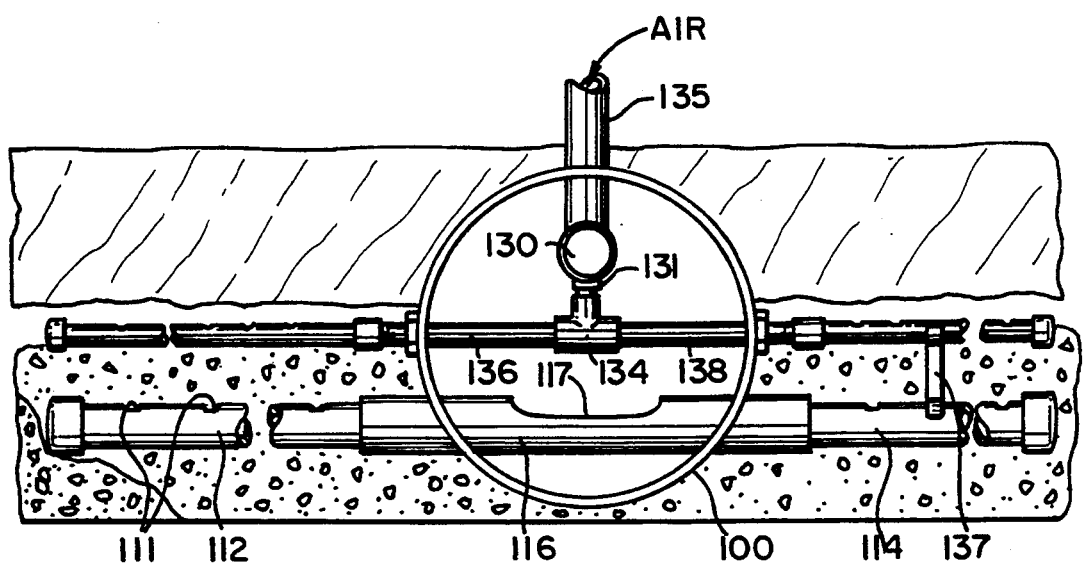
FIG. 2 is an elevation view of the system illustrated in FIG. 1 and further illustrating the placement of a gravel bed to support the system.

Referring now to FIG. 2, an elevation view of the preferred embodiment shown in FIG. 1 is illustrated, along with a portion of the filter bed and related materials that are used in conjunction with the present invention. As explained above, in a down flow or filtration mode, the liquid conducting manifold 100 receives liquid, primarily filtered water from the liquid conducting laterals 110. The water enters the conducting laterals 110 through a series of orifices 111 that provide a passage for liquid to flow between the interior of the liquid conducting laterals 110 and the environment of the filtration bed 50. In the reverse situation, during backwash, backwash liquid flows through the liquid conducting manifold 100 and is distributed via the liquid conducting laterals 110 to the bottom of the filtration bed 50. As well known to those of skill in the art, as the backwash liquid is forced upward through the filtration bed it dislodges and removes trapped sediment and other contaminants, thereby cleaning the filtration bed 50.

It is also known that the addition of a distribution of air or other gas before or during backwash using liquid aids the efficiency and efficacy of the cleaning procedure. Thus, in use, the air supply pipe 135 provides a flow of pressurized air or other gas to the air manifold 130. The backwash gas is distributed to the filtration bed 50 by the air laterals 132 via the perforations 133 or nozzles, etc., that are in communication with the air laterals 132. As seen in FIG. 2, in certain embodiments it may be desirable to provide air lateral supports 137 to hold the air laterals 132 in place during assembly. The air laterals 132 themselves are preferably supported in a gravel layer 52 as are the other components of the air and liquid distribution system described above.

The provision of the lateral connector 116 shown in FIGS. 1 and 2 provides a unique, easy to manufacture and structurally sound system. As will be readily understood by those of ordinary skill, creating a structure that permits a tube to extend though the wall of another larger tube across a chord is difficult. Typically, molded or welded bosses are provided, however, the sharp radii at the juncture of the outer wall of the larger tube act as stress concentrators and lead to early failure, particularly when the load on the joint is cycled due to, for example, thermal variations. However, particularly when working with pipe, drilling an off-center (chord) bore to pierce two sides of a tubular wall is not an exceptionally difficult task. In the present invention, the lateral connector 116 is simply inserted into a bore with a close, friction fit and bonded using heat and/or chemical cement. Particularly in embodiments where the lateral connector 116 is formed of a substantially complete tube, a rigid and stable structure is obtained. The ends of the lateral connector 116 are then attached to the perforated laterals 112,114 using either a bonded joint or, more preferably, a threaded connection.

Figure 3:
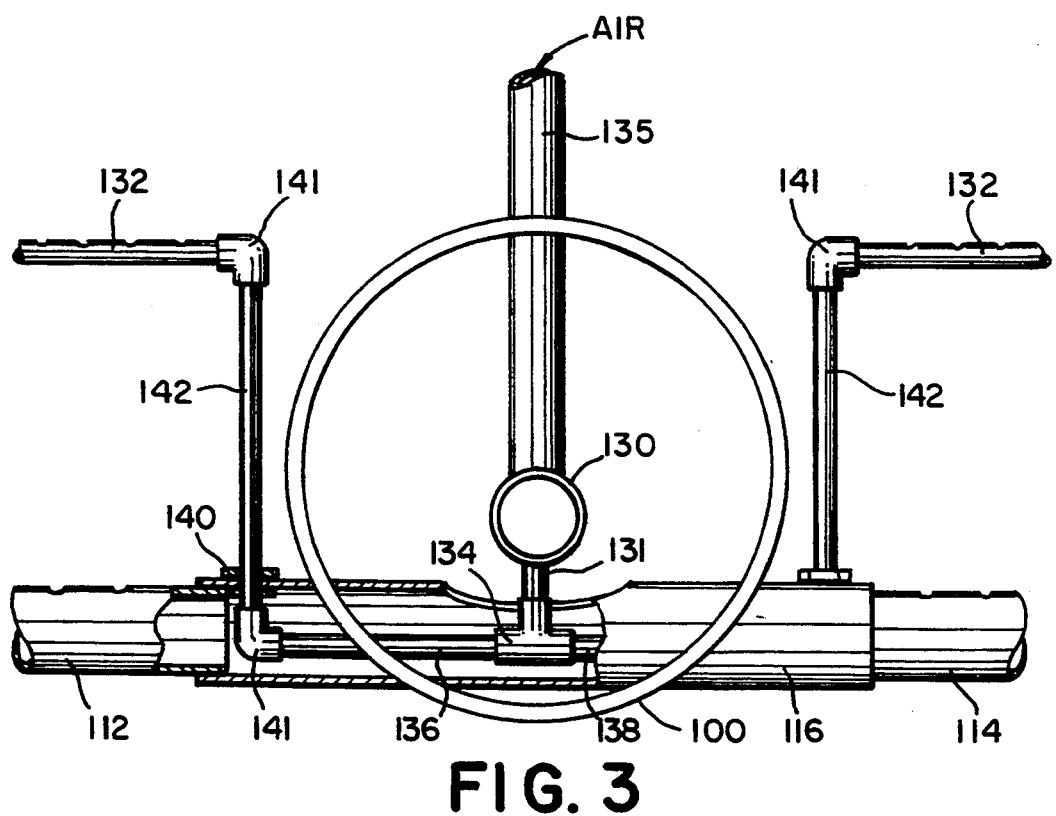
FIG. 3 is an elevation view, similar to FIG. 2, of an alternate embodiment of the present invention.

Referring now to FIG. 3, an alternate embodiment of the present invention is illustrated. The view shown is similar to FIG. 2, and like reference numerals represent like components. In the embodiment illustrated in FIG. 3, the air manifold 130 is disposed much lower in the interior of the water conducting manifold 100 so that the connecting sections 136,138 travel through the interior of the lateral connector 116 as shown. This same construction could be achieved by a lengthening the connecting section 131 between the air manifold 130 and the inlet to the "Tee" connector 134, resulting in the air manifold 130 being in a position within the liquid conducting manifold 100 as shown in FIG. 2. Because of the relocation of the air system, the hollow threaded plug 140 described above is now located on the portions of the lateral connector 116 that protrude beyond the liquid conducting manifold 100. As shown, in this embodiment the connecting sections 136,138 require right angle fittings 141 at either end or a vertical riser 142 that raises the position of the air laterals 132 above the liquid conducting laterals 110. In use, the embodiment shown in FIG. 3 functions in the same manner as the embodiment described in FIGS. 1-2.

Thus, in either the design illustrated in FIGS. 1-2 or in FIG. 3, the resulting fluid distribution grid is substantially contained within the fluid conducting conduit 100 and the tops of the air laterals 132 do not have to be placed higher than the top of the liquid conducting conduit unless a greater height is chosen by design. For this reason, the combination of a liquid distribution grid and an air distribution grid provided by the present invention is truly a "low profile" system. In a preferred embodiment, therefore, the entire underdrain and gravel bed that supports and surrounds it need be only about 12.0 inches deep. It will be readily appreciated that such a system permits full advantage to be taken of the depth of the filter bed and also permits shallow underdrains that use conventional blocks and that do not have an air backwash system to be retrofitted without loss of depth and in an economical and efficient manner.

Figure 4:
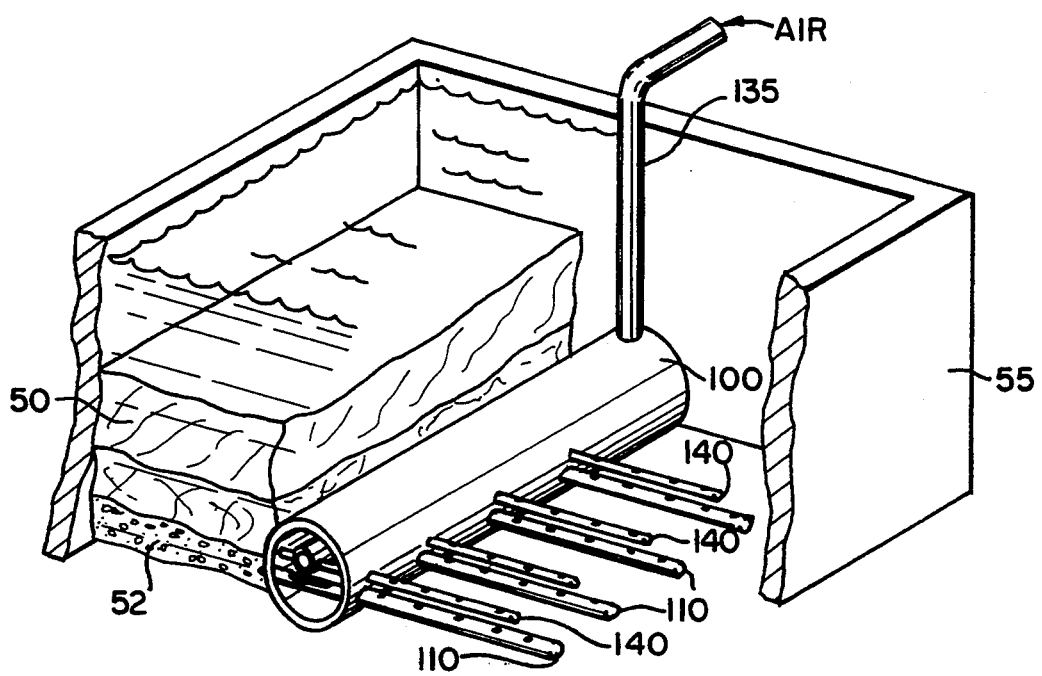
FIG. 4 is a perspective view, partially broken away, of an underdrain incorporating the present invention.

Referring now to FIG. 4, a filtration system made in accordance with the fluid distribution system of the present invention in place, with a portion of the filtration bed 50 removed for illustration, is illustrated. A filter structure 55 such as a concrete casing surrounds the filtration bed 50, that is shown partially broken away and removed to better illustrate the invention. The bottom of the filtration bed 50 is preferably comprised of a layer of gravel 52 that supports the liquid conducting manifold 100 and laterals 110, as well as the air laterals 132, as explained above. The filtration bed 50 overlies the gravel 52 and, as known in the art, may be comprised of layers of sand, anthracite material, granular activated carbon (GAC), further layers of gravel, or layers of other types of filter media such as glass pellets, ceramics, plastic beads, or porous plates. Also visible in FIG. 4 is the air inlet 135 that is connected to a pressurized source of air or other gas.

The underdrain of the present invention can also be used as a strainer. In such applications the layer or layers of gravel referred to above are omitted. Additionally, in such embodiments it will often be preferable to place a strainer assembly 200 over the orifices 111, as shown in FIG. 1. The designs of such strainer and their function and use are well known in the art.

Although certain embodiments of the present invention have been described above with particularity, these embodiments are for purposes of illustrating the function and use of the present invention and are not meant to be limiting. Upon review of the foregoing specification, those of skill in the art will comprehend numerous variations, adaptations and modifications of the present invention. For example, the geometry of both the arrangement of the air distribution system and the fluid distribution system can be widely varied without departing from the concepts taught above. Similarly, the length, number and arrangement of both the air laterals and liquid conducting laterals may be changed to suit particular design needs in terms of both size and layout. Accordingly, reference should be made to the claims appended hereto in order to determine the full scope of what is encompassed by the present invention.

What is claimed is:

1. A low profile underdrain and air grid system comprising:

a liquid conducting manifold;
a plurality of liquid conducting laterals in communication with and extending from the liquid conducting manifold wherein the liquid conducting manifold defines a manifold wall and each of said plurality of liquid conducting laterals is connected to a lateral connector inserted through and extending from a connection point outside the liquid conducting manifold through the manifold wall;
an air header disposed within the liquid conducting manifold; and
a plurality of air laterals connected to the air header, each of said plurality of air laterals extending from the air header and through the wall of the liquid conducting manifold to a point outside said plurality liquid conducting laterals.

2. The system of claim 1, wherein one of said plurality of air laterals is disposed within each of said plurality of liquid conducting laterals, and extends through an interior section of the liquid conducting lateral and through the manifold wall to a point outside the liquid conducting manifold and outside the liquid conducting lateral.

3. The system of claim 1, further comprising a water inlet in the manifold wall.

4. The system of claim 1, wherein each lateral connector is defined by a circular tube which extends from a point outside the manifold laterally through the manifold to a point on the opposing outer side of the manifold, said circular tube defining a connector wall wherein a portion of the connector wall disposed inside the liquid conducting manifold is removed to define an opening through the wall of said circular tube.

5. The system of claim 1 wherein each lateral connector extends through the manifold wall on a first side and emerges on a second side to define first and second connection points.

6. The system of claim 1, wherein the liquid conducting manifold and each lateral connector are comprised of circular tubes.

7. The system of claim 6 wherein the liquid conducting manifold has a first diameter and each lateral connector has a second, smaller diameter and passes through the manifold wall at a point offset from the center of the liquid conducting manifold.

8. The system of claim 1 wherein the liquid conducting laterals further comprise a plurality of orifices.

9. The system of claim 8 further comprising strainers disposed across one or more of the plurality of orifices.

10. The system of claim 1 wherein the liquid conducting manifold is comprised of a cylindrical pipe.

11. The system of claim 10 wherein the pipe is comprised of polyvinylchloride (PVC).

12. The system of claim 10 wherein the pipe is comprised of stainless steel.

13. A low profile underdrain and air grid system comprising:
   a liquid conducting manifold defining a manifold wall and an interior opening having a diameter;
   a plurality of lateral connectors, each of said plurality of lateral connectors extending from a connection point outside the manifold, through the manifold wall, and into the interior opening;
   a plurality of liquid conducting laterals, each of said plurality of liquid conducting laterals being connected to one of said plurality of lateral connectors;
   an air header disposed within the liquid conducting manifold; and
   a plurality of air laterals connected to the air header, and extending from the air header through the liquid conducting manifold at points separated from each said connection point,
   whereby the air laterals are spaced apart from and outside of the liquid conducting laterals.

14. A method of installing an underdrain in a filtration system comprising the steps of:
   positioning one or more liquid conduits, each comprising an air conduit disposed within each liquid conduit, within a floor section of the filtration system;
   attaching a plurality of liquid conducting laterals to each liquid conduit, each of said plurality of liquid conducting laterals being attached to said liquid conduit by a lateral connector in fluid communication with an interior portion of said liquid conduit;
   attaching a plurality of air laterals to each air conduit, each of said plurality of air laterals extending through said liquid conduit, said plurality of air laterals being spaced apart from said liquid conducting laterals;
   substantially covering the conduits and laterals with a layer of gravel; and
   covering the layer of gravel with one or more layers of filter media.

15. The method of claim 14 further comprising the step of attaching supporting members to the air laterals before the step of covering the conduits and laterals with gravel.

* * * * *

UNITED STATES PATENT AND TRADEMARK OFFICE
CERTIFICATE OF CORRECTION

PATENT NO. : 5,413,710
DATED : May 9, 1995
INVENTOR(S) : R. Lee Roberts, Douglas H. Eden It is certified that error appears in the above-indentified patent and that said Letters Patent is hereby corrected as shown below:

Col. 3, line 49, "though" should be --through--.

Col. 5, line 12, "though" should be --through--.

Signed and Sealed this

Twenty-fourth Day of October, 1995

*Attest:*

BRUCE LEHMAN

*Attesting Officer*   *Commissioner of Patents and Trademarks*